US012160721B2

(12) United States Patent
Ren et al.

(10) Patent No.: US 12,160,721 B2
(45) Date of Patent: Dec. 3, 2024

(54) COAXIAL SPEAKER

(71) Applicant: AAC Microtech (Changzhou) Co., Ltd., Changzhou (CN)

(72) Inventors: Zhang Ren, Shenzhen (CN); Zhiwei Zhong, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 213 days.

(21) Appl. No.: 18/089,584

(22) Filed: Dec. 28, 2022

(65) Prior Publication Data

US 2024/0073617 A1 Feb. 29, 2024

Related U.S. Application Data

(63) Continuation of application No. PCT/CN2022/125115, filed on Oct. 13, 2022.

(30) Foreign Application Priority Data

Aug. 30, 2022 (CN) ......................... 202222293300.6

(51) Int. Cl.

| | |
|---|---|
| ***H04R 9/02*** | (2006.01) |
| ***H04R 7/04*** | (2006.01) |
| ***H04R 9/04*** | (2006.01) |
| ***H04R 9/06*** | (2006.01) |

(52) U.S. Cl.

CPC ............... *H04R 9/025* (2013.01); *H04R 7/04* (2013.01); *H04R 9/046* (2013.01); *H04R 9/06* (2013.01); *H04R 2400/11* (2013.01)

(58) Field of Classification Search

CPC ...... H04R 7/04; H04R 2400/11; H04R 11/05; H04R 9/00; H04R 9/02; H04R 9/025; H04R 9/04; H04R 9/041; H04R 9/046; H04R 9/06; H04R 9/063

USPC ................ 381/412, 419, 420, 421, 401, 405

See application file for complete search history.

(56) References Cited

U.S. PATENT DOCUMENTS

| | | | | |
|---|---|---|---|---|
| 6,370,257 | B1 * | 4/2002 | Bleim | H04R 9/06 381/409 |
| 2001/0017491 | A1 * | 8/2001 | Ruberl | B06B 1/045 310/36 |
| 2024/0015431 | A1 * | 1/2024 | Lu | H04R 1/30 |

FOREIGN PATENT DOCUMENTS

| | | | | |
|---|---|---|---|---|
| CN | 201797594 U | * | 4/2011 | H04R 9/02 |
| CN | 207166758 U | * | 3/2018 | H04R 9/02 |
| CN | 210298050 U | * | 4/2020 | H04R 9/02 |

(Continued)

*Primary Examiner* — Ahmad F. Matar
*Assistant Examiner* — Sabrina Diaz
(74) *Attorney, Agent, or Firm* — W&G Law Group

(57) ABSTRACT

Disclosed is a coaxial speaker, including a magnetic circuit system, a first sounding unit, a second sounding unit around the first sounding unit, a flexible printed circuit board electrically connected to the first sounding unit, an insert inserted in the magnetic circuit system for supporting the flexible printed circuit board, and a conductive terminal embedded in the insert for electrically connecting the flexible printed circuit board to an external circuit. The flexible printed circuit board has a first fixing part connected to the insert, a second fixing part connected to the first sounding unit, and a resilient arm connected between the two fixing parts and including two arms respectively extending in two different directions. The coaxial speaker has a high sound quality and a receiver function.

10 Claims, 4 Drawing Sheets

A-A

(56) References Cited

FOREIGN PATENT DOCUMENTS

CN 113596686 A * 11/2021 ............... H04R 9/06

* cited by examiner

A-A

B-B

COAXIAL SPEAKER

FIELD OF THE PRESENT DISCLOSURE

The present disclosure relates to electroacoustic transducers, in particular to a coaxial speaker.

DESCRIPTION OF THE RELATED ART

A coaxial speaker is a speaker with both a high-frequency sounding unit and a low-frequency sounding unit, and the high-frequency sounding unit and the low-frequency sounding unit are coaxially arranged. The high-frequency sounding unit and the low-frequency sounding unit of the coaxial speaker can be located together on the front side of the coaxial speaker, or can be respectively located on the front and back sides of the coaxial speaker.

A coaxial speaker in the related art, the low-frequency sounding unit surrounds the high-frequency sounding unit. A lead of the high-frequency sounding voice coil of the high-frequency sounding unit is directly connected to a terminal through which it is connected to an external circuit. However, when the coaxial speaker works, because the high-frequency sounding voice coil is only glued to the high-frequency sounding diaphragm and lacks reliable supports, vibrations of the high-frequency sounding voice coil are relatively unstable. In addition, during the high-frequency sounding voice coil vibrates, because the lead of the high-frequency sounding voice coil is directly welded to the terminal, it is very easy to break the lead and produce collision noises due to pulling, resulting in a poor quality of the coaxial speaker.

Thus, it is necessary to provide a novel coaxial speaker to solve the problem.

SUMMARY

An objective of the present disclosure is to overcome the above technical problems and provide a coaxial speaker having a high sound quality and a receiver function.

In order to achieve the objective mentioned above, the present disclosure discloses a coaxial speaker including a magnetic circuit system; a first sounding unit, including a first diaphragm and a first voice coil driving the first diaphragm for vibrating and emitting sounds; a second sounding unit arranged coaxially with and around the first sounding unit, including a second diaphragm and a second voice coil driving the second diaphragm for vibrating and emitting sounds; a first flexible printed circuit board electrically connected to the first voice coil; an insert inserted in the magnetic circuit system for supporting the first flexible printed circuit board; and a conductive terminal embedded in the insert for electrically connecting the first flexible printed circuit board to an external circuit. The magnetic circuit system is provided with a first magnetic gap and a second magnetic gap. The first voice coil locates in the first magnetic gap. The second voice coil locates in the second magnetic gap. The first flexible printed circuit board includes a first fixing part fixed to the insert, a second fixing part sandwiched between the first voice coil and the first diaphragm, and a resilient arm connecting the first fixing part and the second fixing part. The resilient arm includes a first arm connected to the first fixing part and extending in a first direction, and a second arm connecting the first arm and the second fixing part and extending in a second direction different from the first direction.

As an improvement, the magnetic circuit system includes a magnetic bowl and a magnetic unit disposed in the magnetic bowl. The magnetic bowl includes a bottom wall provided with a first through hole and a first side wall extending from an outer periphery of the bottom wall. The magnetic unit is fixed to the bottom wall and spaced apart from the first side wall for forming the second magnetic gap. The magnetic unit includes a first magnet in an annular shape fixed to the bottom wall, a yoke fixed to the first magnet, a second magnet in an annular shape fixed to the yoke, and a pole plate fixed to the second magnet. The yoke includes an annular plate provided with a second through hole and sandwiched between the first magnet and the second magnet, and a pair of second side walls opposite to each other extending from an inner edge of the annular plate. The second magnet and the pole plate are spaced apart from the pair of second side walls for forming the first magnetic gap.

As an improvement, the first flexible printed circuit board is disposed between the pair of second side walls. The pair of second side walls are at least partially misaligned.

As an improvement, the insert extends from the first through hole of the bottom wall and through the first magnet and the second through hole of the annular plate to a space between the pair of second side walls.

As an improvement, the insert is provided with a first step and a second step located above the first step. The first magnet is partially stacked on the first step. The annular plate is partially stacked on the second step.

As an improvement, the first direction is perpendicular to a vibration direction of the first voice coil and extends along a long axis of the first voice coil. The second direction extends along the vibration direction of the first voice coil.

As an improvement, the coaxial speaker further includes a first frame and a second frame around the first frame. The first frame is fixed to the second magnet. The magnetic bowl further includes an extension wall extending from a top of the first side wall in a direction away from the magnetic unit. An amount of the extension walls is two, the two extension walls are respectively arranged on two opposite long-axis sides of the coaxial speaker. The second frame is fixed to the two extension walls.

As an improvement, the first diaphragm is fixed to the first frame. An outer fixing part of the second diaphragm is fixed to the second frame, an inner fixing part of the second diaphragm is fixed to the second magnet.

As an improvement, the second sounding unit further includes an elastic supporting member opposite to and spaced apart from the second diaphragm, and a skeleton connected between the second diaphragm and the elastic supporting member. An amount of the elastic supporting members is two, the two elastic supporting members are respectively arranged on two opposite short-axis sides of the coaxial speaker. The skeleton includes two supporting arms respectively fixed to the two elastic supporting members. Each supporting arm is arranged between the second frame and the first side wall. An outer fixing portion of each elastic supporting member is fixed to the second frame, an inner fixing portion of each elastic supporting member is fixed to a corresponding one of the two supporting arms. Each elastic supporting member includes a second flexible printed circuit board fixed to a corresponding one of the two supporting arms and an auxiliary diaphragm fixed to a lower surface of the second flexible printed circuit board.

As an improvement, the second fixing part is provided with a pad. The pad locates on an inner side of the first voice coil. A lead of the first voice coil is soldered to the pad.

In the coaxial speaker according to the present disclosure, besides the first sounding unit emits high-frequency sounds and the second sounding unit emits low-frequency sounds for providing high quality full-frequency sounds, the first flexible printed circuit board with a three-dimensional structure realizes a reliable electrical conduction for the first sounding unit and increases a vibration amplitude of the first sounding unit so that the first sounding unit can perform a receiver function.

BRIEF DESCRIPTION OF THE DRAWINGS

In order to more clearly illustrate the technical solutions in embodiments of the present disclosure, the accompanying drawings used in the description of the embodiments will be briefly introduced below. It is apparent that, the accompanying drawings in the following description are only some embodiments of the present disclosure, and other drawings can be obtained by those of ordinary skill in the art based on the accompanying drawings without creative efforts, wherein.

DETAILED DESCRIPTION OF THE EMBODIMENTS

The technical solutions in embodiments of the present disclosure will be described clearly and completely below with reference to the accompanying drawings in the embodiments of the present disclosure. It is apparent that, the described embodiments are merely some of rather than all of the embodiments of the present disclosure. All other embodiments acquired by those of ordinary skill in the art without creative efforts based on the embodiments of the present disclosure shall fall within the protection scope of the present disclosure.

Figure 1:
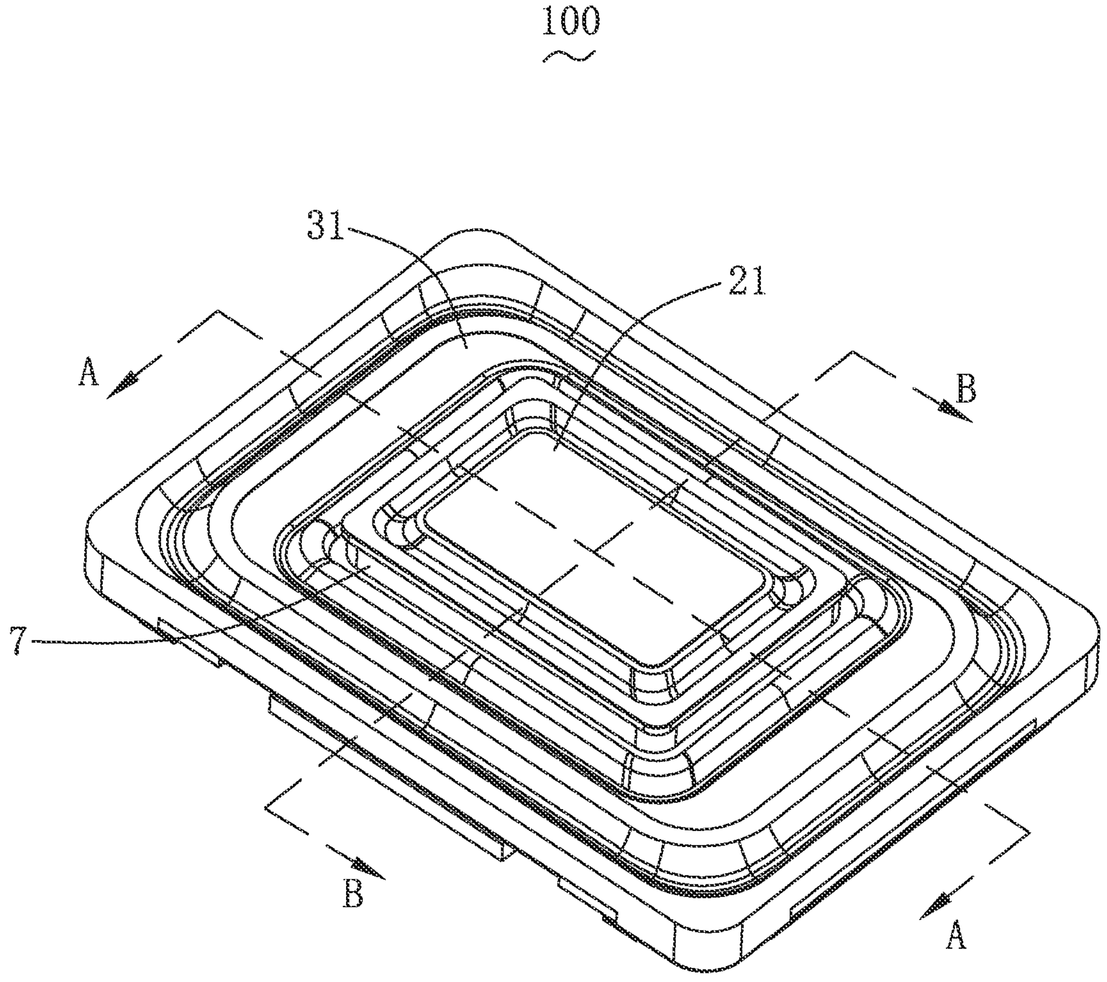
FIG. 1 is an isometric view of a coaxial speaker in accordance with an exemplary embodiment of the present disclosure.
Figure 2:
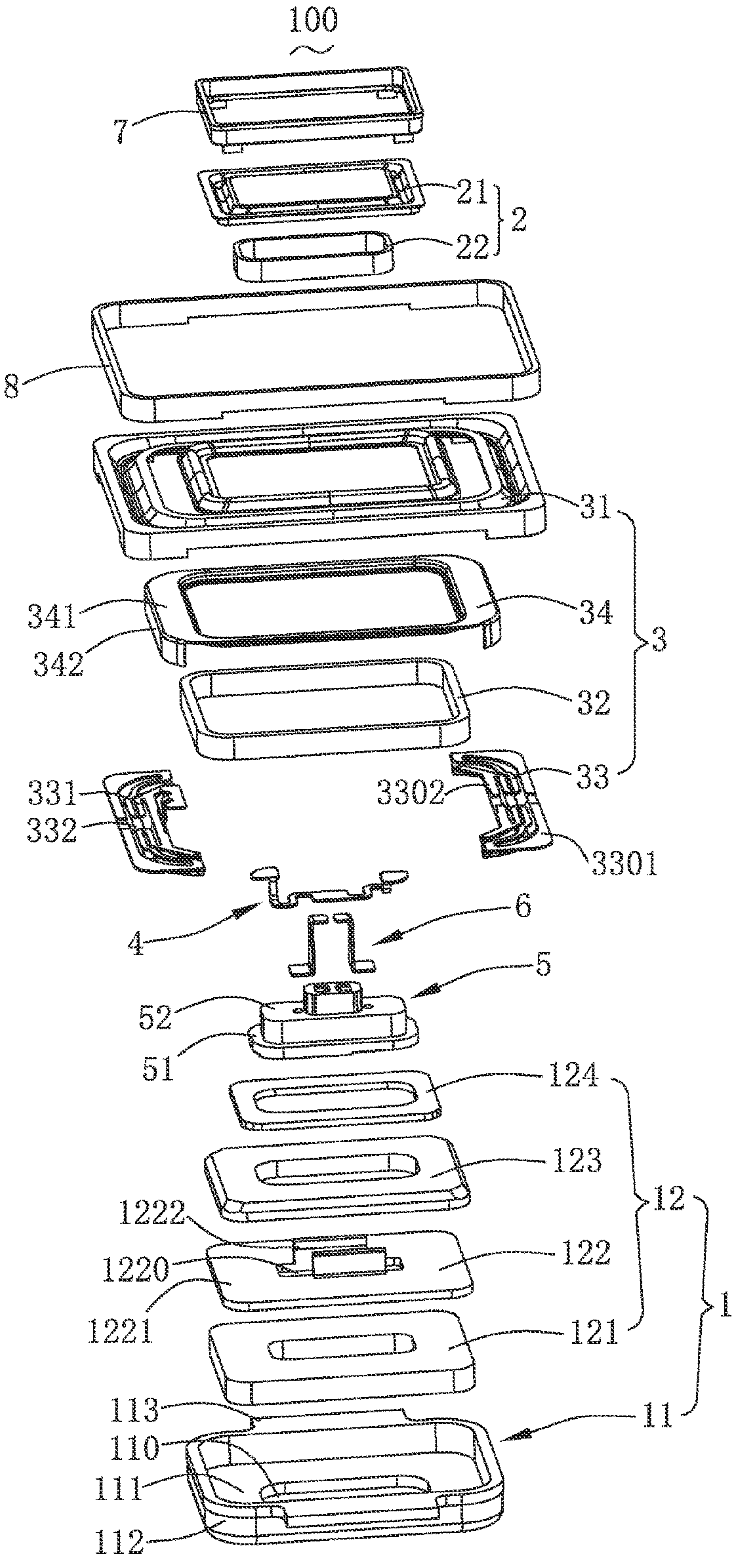
FIG. 2 is an exploded view of the coaxial speaker in FIG. 1.
Figure 3:
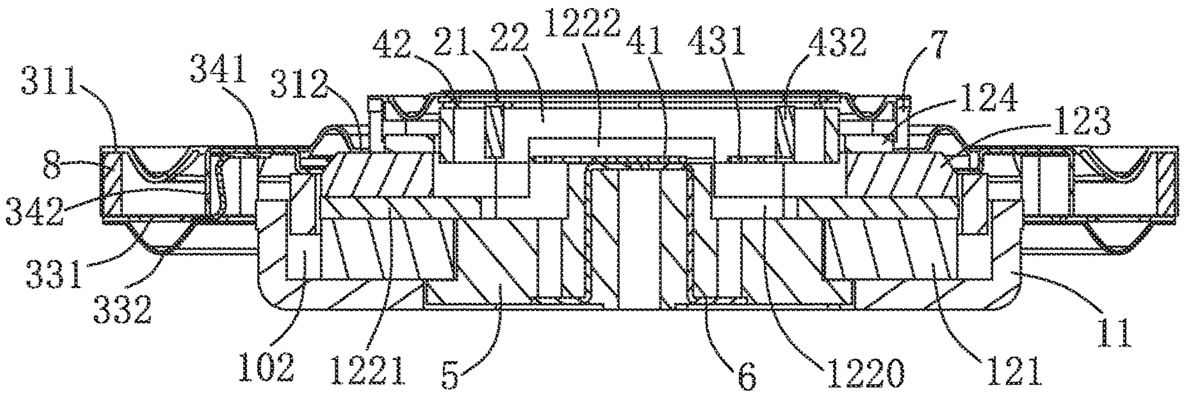
FIG. 3 is a cross-sectional view of the coaxial speaker, taken along line A-A in FIG. 1.
Figure 4:
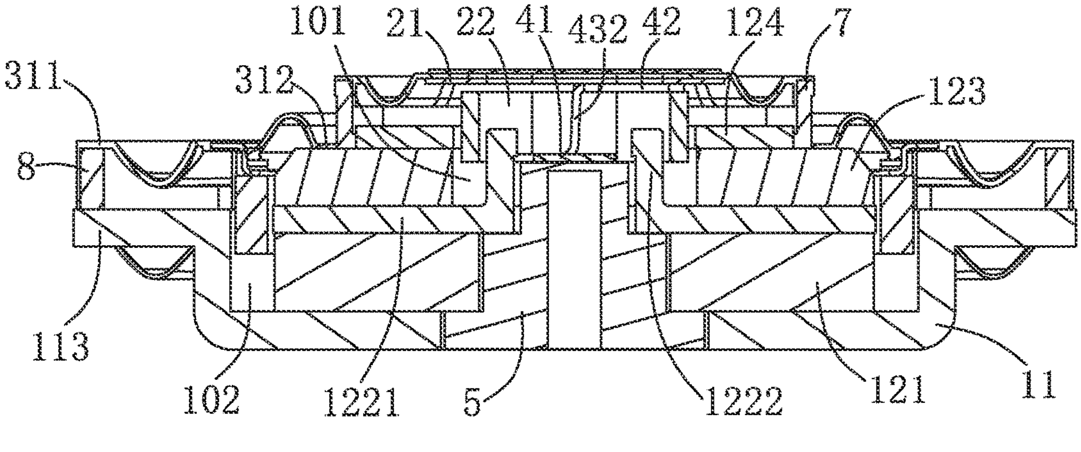
FIG. 4 is a cross-sectional view of the coaxial speaker, taken along line B-B in FIG. 1.
Figure 5:
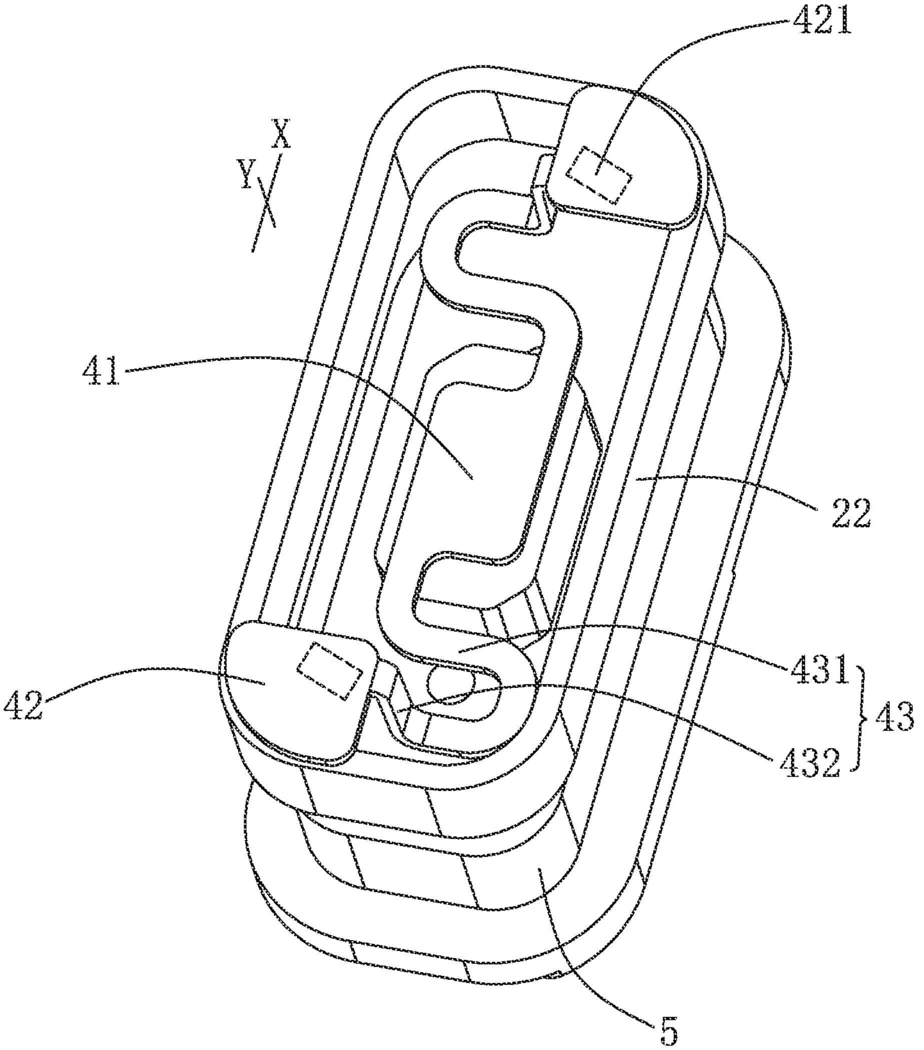
FIG. 5 is an isometric view of an assembly of a first voice coil, an insert and a first flexible printed circuit board of the coaxial speaker in FIG. 1.

Referring to FIGS. 1-5, the present disclosure discloses a coaxial speaker 100 including a magnetic circuit system 1, a first sounding unit 2 and a second sounding unit 3 arranged coaxially with and around the first sounding unit 2.

The first sounding unit 2 includes a first diaphragm 21 and a first voice coil 22 driving the first diaphragm 21 for vibrating and emitting sounds. The second sounding unit 3 includes a second diaphragm 31 and a second voice coil 32 driving the second diaphragm 31 for vibrating and emitting sounds. The magnetic circuit system 1 is provided with a first magnetic gap 101 and a second magnetic gap 102. The first voice coil 22 locates in the first magnetic gap 101. The second voice coil 32 locates in the second magnetic gap 102.

The coaxial speaker 100 further includes a first flexible printed circuit board 4 electrically connected to the first voice coil 22, an insert 5 inserted in the magnetic circuit system 1 for supporting the first flexible printed circuit board 4, and a conductive terminal 6 embedded in the insert 5 for electrically connecting the first flexible printed circuit board 4 to an external circuit.

The first flexible printed circuit board 4 includes a first fixing part 41 fixed to the insert 5, a second fixing part 42 sandwiched between the first voice coil 22 and the first diaphragm 21, and a resilient arm 43 connecting the first fixing part 41 and the second fixing part 42. The resilient arm 43 includes a first arm 431 connected to the first fixing part 41 and extending in a first direction X, and a second arm 432 connecting the first arm 431 and the second fixing part 42 and extending in a second direction Y different from the first direction X. Optionally, the first direction X is perpendicular to a vibration direction of the first voice coil 22 and extends along a long axis of the first voice coil 22. The second direction Y extends along the vibration direction of the first voice coil 22. Optionally, the first arm 431 may have a continuous S-shaped structure for increasing a length of its force arm. The second fixing part 42 is provided with a pad 421. The pad 421 locates on an inner side of the first voice coil 22. A lead of the first voice coil 22 is soldered to the pad 421.

The magnetic circuit system 1 includes a magnetic bowl 11 and a magnetic unit 12 disposed in the magnetic bowl 11. The magnetic bowl 11 includes a bottom wall 111 provided with a first through hole 110 and a first side wall 112 extending from an outer periphery of the bottom wall 111. The magnetic unit 12 is fixed to the bottom wall 111 and spaced apart from the first side wall 112 for forming the second magnetic gap 102. The magnetic unit 12 includes a first magnet 121 in an annular shape fixed to the bottom wall 111, a yoke 122 fixed to the first magnet 121, a second magnet 123 in an annular shape fixed to the yoke 122, and a pole plate 124 fixed to the second magnet 123. The yoke 122 includes an annular plate 1221 provided with a second through hole 1220 and sandwiched between the first magnet 121 and the second magnet 123, and a pair of second side walls 1222 opposite to each other extending from an inner edge of the annular plate 1221. The second magnet 123 and the pole plate 124 are spaced apart from the pair of second side walls 1222 for forming the first magnetic gap 101.

The first flexible printed circuit board 4 is disposed between the pair of second side walls 1222. The pair of second side walls 1222 are at least partially misaligned. The misaligned position may form an avoiding space for the first arm 431.

The insert 5 extends from the first through hole 110 of the bottom wall 111 and through the first magnet 121 and the second through hole 1220 of the annular plate 1221 to a space between the pair of second side walls 1222. The insert 5 is provided with a first step 51 and a second step 52 located above the first step 51. The first magnet 121 is partially stacked on the first step 51. The annular plate 1221 is partially stacked on the second step 52.

The coaxial speaker 100 further includes a first frame 7 and a second frame 8 around the first frame 7. The first frame 7 is fixed to the second magnet 123. The magnetic bowl 11 further includes an extension wall 113 extending from a top of the first side wall 112 in a direction away from the magnetic unit 12. An amount of the extension walls 113 is two, the two extension walls 113 are respectively arranged on two opposite long-axis sides of the coaxial speaker 100. The second frame 8 is fixed to the two extension walls 113.

The first diaphragm 21 is fixed to the first frame 7. An outer fixing part 311 of the second diaphragm 31 is fixed to the second frame 8, an inner fixing part 312 of the second diaphragm 31 is fixed to the second magnet 123.

The second sounding unit 3 further includes an elastic supporting member 33 opposite to and spaced apart from the second diaphragm 31, and a skeleton 34 connected between the second diaphragm 31 and the elastic supporting member 33. An amount of the elastic supporting members 33 is two, the two elastic supporting members 33 are respectively arranged on two opposite short-axis sides of the coaxial speaker 100. The skeleton 34 includes a main body part 341 and two supporting arms 342 extending from the main body part 341 and respectively fixed to the two elastic supporting members 33. Each supporting arm 342 is arranged between the second frame 8 and the first side wall 112. An outer fixing portion 3301 of each elastic supporting member 33 is fixed to the second frame 8, an inner fixing portion 3302 of each elastic supporting member 33 is fixed to a corresponding one of the two supporting arms 342. The main body part 341 serves as a part of the second diaphragm 31.

Each elastic supporting member 33 includes a second flexible printed circuit board 331 fixed to a corresponding one of the two supporting arms 342 and an auxiliary diaphragm 332 fixed to a lower surface of the second flexible printed circuit board 331 away from the second diaphragm 31. The second voice coil 32 is electrically connected to an external circuit through the second flexible printed circuit board 331.

In the coaxial speaker according to the present disclosure, besides the first sounding unit emits high-frequency sounds and the second sounding unit emits low-frequency sounds for providing high quality full-frequency sounds, the first flexible printed circuit board with a three-dimensional structure realizes a reliable electrical conduction for the first sounding unit and increases a vibration amplitude of the first sounding unit so that the first sounding unit can perform a receiver function.

The above are only embodiments of the present disclosure. It should be pointed out that those of ordinary skill in the art may also make improvements without departing from the ideas of the present disclosure, all of which fall within the protection scope of the present disclosure.

What is claimed is:

1. A coaxial speaker, comprising:

a magnetic circuit system;

a first sounding unit, comprising a first diaphragm and a first voice coil driving the first diaphragm for vibrating and emitting sounds;

a second sounding unit arranged coaxially with and around the first sounding unit, comprising a second diaphragm and a second voice coil driving the second diaphragm for vibrating and emitting sounds;

a first flexible printed circuit board electrically connected to the first voice coil;

an insert inserted in the magnetic circuit system for supporting the first flexible printed circuit board; and a conductive terminal embedded in the insert for electrically connecting the first flexible printed circuit board to an external circuit, wherein the magnetic circuit system is provided with a first magnetic gap and a second magnetic gap, the first voice coil locates in the first magnetic gap, the second voice coil locates in the second magnetic gap, the first flexible printed circuit board comprises a first fixing part fixed to the insert, a second fixing part sandwiched between the first voice coil and the first diaphragm, and a resilient arm connecting the first fixing part and the second fixing part, the resilient arm comprises a first arm connected to the first fixing part and extending in a first direction, and a second arm connecting the first arm and the second fixing part and extending in a second direction different from the first direction.

2. The coaxial speaker as described in claim 1, wherein the magnetic circuit system comprises a magnetic bowl and a magnetic unit disposed in the magnetic bowl, the magnetic bowl comprises a bottom wall provided with a first through hole and a first side wall extending from an outer periphery of the bottom wall, the magnetic unit is fixed to the bottom wall and spaced apart from the first side wall for forming the second magnetic gap, the magnetic unit comprises a first magnet in an annular shape fixed to the bottom wall, a yoke fixed to the first magnet, a second magnet in an annular shape fixed to the yoke, and a pole plate fixed to the second magnet, the yoke comprises an annular plate provided with a second through hole and sandwiched between the first magnet and the second magnet, and a pair of second side walls opposite to each other extending from an inner edge of the annular plate, the second magnet and the pole plate are spaced apart from the pair of second side walls for forming the first magnetic gap.

3. The coaxial speaker as described in claim 2, wherein the first flexible printed circuit board is disposed between the pair of second side walls, the pair of second side walls are at least partially misaligned.

4. The coaxial speaker as described in claim 2, wherein the insert extends from the first through hole of the bottom wall and through the first magnet and the second through hole of the annular plate to a space between the pair of second side walls.

5. The coaxial speaker as described in claim 4, wherein the insert is provided with a first step and a second step located above the first step, the first magnet is partially stacked on the first step, the annular plate is partially stacked on the second step.

6. The coaxial speaker as described in claim 1, wherein the first direction is perpendicular to a vibration direction of the first voice coil and extends along a long axis of the first voice coil, the second direction extends along the vibration direction of the first voice coil.

7. The coaxial speaker as described in claim 2, further comprising a first frame and a second frame around the first frame, wherein the first frame is fixed to the second magnet, the magnetic bowl further comprises an extension wall extending from a top of the first side wall in a direction away from the magnetic unit, an amount of the extension walls is two, the two extension walls are respectively arranged on two opposite long-axis sides of the coaxial speaker, the second frame is fixed to the two extension walls.

8. The coaxial speaker as described in claim 7, wherein the first diaphragm is fixed to the first frame, an outer fixing part of the second diaphragm is fixed to the second frame, an inner fixing part of the second diaphragm is fixed to the second magnet.

9. The coaxial speaker as described in claim 7, wherein the second sounding unit further comprises an elastic supporting member opposite to and spaced apart from the second diaphragm, and a skeleton connected between the second diaphragm and the elastic supporting member, an amount of the elastic supporting members is two, the two elastic supporting members are respectively arranged on two opposite short-axis sides of the coaxial speaker, the skeleton comprises two supporting arms respectively fixed to the two elastic supporting members, each supporting arm is arranged between the second frame and the first side wall, an outer fixing portion of each elastic supporting member is fixed to the second frame, an inner fixing portion of each elastic supporting member is fixed to a corresponding one of the two supporting arms, each elastic supporting member comprises a second flexible printed circuit board fixed to a corresponding one of the two supporting arms and an auxiliary diaphragm fixed to a lower surface of the second flexible printed circuit board.

10. The coaxial speaker as described in claim 1, wherein the second fixing part is provided with a pad, the pad locates on an inner side of the first voice coil, a lead of the first voice coil is soldered to the pad.

* * * * *